(12) United States Patent
Zhang

(10) Patent No.: US 10,645,332 B2
(45) Date of Patent: May 5, 2020

(54) SUBTITLE DISPLAYING METHOD AND APPARATUS

(71) Applicant: Alibaba Group Holding Limited, Grand Cayman (KY)

(72) Inventor: Lei Zhang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/442,329

(22) Filed: Jun. 14, 2019

(65) Prior Publication Data
US 2019/0394419 A1   Dec. 26, 2019

(30) Foreign Application Priority Data

Jun. 20, 2018  (CN) .......................... 2018 1 0638725

(51) Int. Cl.
*G06K 9/00*      (2006.01)
*H04N 5/445*     (2011.01)
(52) U.S. Cl.
CPC ......... *H04N 5/445* (2013.01); *G06K 9/00228* (2013.01); *G06K 9/00744* (2013.01)
(58) Field of Classification Search
CPC .................. H04N 21/4884; G06K 9/3266
USPC ..................................................... 348/468
See application file for complete search history.

(56) References Cited

U.S. PATENT DOCUMENTS

| | | | |
|---|---|---|---|
| 7,925,138 B2 | 4/2011 | Ando et al. | |
| 8,079,054 B1* | 12/2011 | Dhawan | G06Q 30/00 725/105 |
| 8,125,567 B2 | 2/2012 | Park | |
| 8,166,398 B2 | 4/2012 | Wang et al. | |
| 8,208,788 B2 | 6/2012 | Ando et al. | |
| 8,521,000 B2 | 8/2013 | Ando et al. | |
| 8,737,811 B2 | 5/2014 | Takeuchi | |
| 2005/0262116 A1* | 11/2005 | Yoo | G11B 27/3027 |
| 2007/0047901 A1 | 3/2007 | Ando et al. | |
| 2007/0092228 A1 | 4/2007 | Ando et al. | |
| 2007/0177849 A1 | 8/2007 | Ando et al. | |
| 2007/0263983 A1 | 11/2007 | Ando et al. | |
| 2009/0273711 A1 | 11/2009 | Chapdelaine et al. | |
| 2009/0303382 A1* | 12/2009 | Hamada | H04N 9/8233 348/468 |
| 2009/0303383 A1* | 12/2009 | Hamada | G11B 20/10527 348/468 |
| 2011/0019088 A1 | 1/2011 | Kase | |

(Continued)

OTHER PUBLICATIONS

The PCT Search Report and Written Opinion dated Sep. 9, 2019 for PCT Application No. PCT/US2019/037364, 7 pages.

*Primary Examiner* — Paulos M Natnael
(74) *Attorney, Agent, or Firm* — Lee & Hayes, P.C.

(57) ABSTRACT

A subtitle displaying method including determining subtitle information of a video frame in a video when a play request for the video is received; identifying a key region in the video frame; determining a subtitle display region in a region in the video frame other than the key region; and displaying subtitle content in the subtitle information in the subtitle display region during playing the video. In the example embodiments of the present disclosure, the subtitle display region is determined to be placed in the region other than the key region, such that display content in the key region is prevented from being blocked by subtitles, thus improving viewing experience of viewers.

20 Claims, 13 Drawing Sheets

(56) References Cited

U.S. PATENT DOCUMENTS

| | | |
|---|---|---|
| 2011/0200092 A1 | 8/2011 | Todoroki et al. |
| 2011/0285726 A1 | 11/2011 | Redmann |
| 2012/0206567 A1* | 8/2012 | Zafarifar ................ H04N 7/025 348/42 |
| 2012/0320100 A1 | 12/2012 | Machida et al. |
| 2013/0010062 A1 | 1/2013 | Redmann |
| 2013/0177891 A1 | 7/2013 | Hammerschmidt |
| 2013/0188016 A1 | 7/2013 | Tsukagoshi |
| 2014/0257995 A1* | 9/2014 | Wang ............... H04N 21/44008 705/14.66 |
| 2014/0359656 A1 | 12/2014 | Banica et al. |
| 2018/0211556 A1 | 7/2018 | Sreedhara |
| 2019/0114486 A1* | 4/2019 | Wang ................ G06K 9/00744 |

* cited by examiner

SUBTITLE DISPLAYING METHOD AND APPARATUS

CROSS REFERENCE TO RELATED PATENT APPLICATIONS

This application claims priority to Chinese Patent Application No. 201810638725.1 filed on 20 Jun. 2018 and entitled "SUBTITLE DISPLAYING METHOD AND APPARATUS," which is incorporated herein by reference in its entirety.

TECHNICAL FIELD

The present disclosure relates to the field of display technologies, and, more particularly, to subtitle displaying methods and apparatuses.

BACKGROUND

In a conventional subtitle displaying method, subtitles are generally displayed in a fixed position of a video frame. When a subtitle has massive content or when key content in a video frame occupies a large display region, the subtitle tends to block content of interest to a viewer, thus degrading viewing experience of the viewer.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The subtitle displaying methods and apparatuses are proposed in the present disclosure to solve the problem that a subtitle may block key content in a video frame.

According to an example embodiment of the present disclosure, a subtitle displaying method is provided, including:

determining subtitle information of a video frame in a video when a play request for the video is received;

identifying a key region in the video frame;

determining a subtitle display region in a region in the video frame other than the key region; and displaying a subtitle content in the subtitle information in the subtitle display region during playing the video.

In an example implementation, the identifying a key region in the video frame includes:

identifying the key region in the video frame by using a deep learning algorithm.

In an example implementation, the identifying the key region in the video frame by using a deep learning algorithm includes:

determining a target object in the video frame by using the deep learning algorithm; and determining a display region where the target object is located as the key region.

In an example implementation, the determining a display region where the target object is located as the key region in the video frame includes:

determining a key part of the target object by using the deep learning algorithm; and determining a display region where the key part is located as the key region.

In an example implementation, the target object includes a face, and the determining a target object in the video frame by using the deep learning algorithm includes:

detecting the video frame by using a face recognition algorithm to obtain the face.

In an example implementation, the identifying a key region in the video frame includes:

traversing the video frame with a key window, and determining a region where the key window is located as a candidate region, wherein the area of the key window is less than that of the video frame;

extracting features in the candidate region, and determining whether the candidate region includes the target object according to the extracted features; and determining the candidate region as the key region when the candidate region includes the target object.

In an example implementation, the identifying a key region in the video frame includes:

identifying the key region in the video frame when the video frame is a close-shot picture of a video frame previous or preceding to the current video frame.

In an example implementation, the determining a subtitle display region in a region in the video frame other than the key region includes:

determining the subtitle display region in the region in the video frame other than the key region according to the subtitle information.

In an example implementation, the subtitle information includes an original subtitle display region in the video frame, and the determining the subtitle display region in the region in the video frame other than the key region according to the subtitle information includes:

adjusting the original subtitle display region to the region in the video frame other than the key region when the original subtitle display region overlaps the key region.

In an example implementation, the adjusting the original subtitle display region to the region in the video frame other than the key region when the original subtitle display region overlaps the key region includes:

dividing the original subtitle display region into at least two display sub-regions and adjusting the at least two display sub-regions to the region in the video frame other than the key region when the original subtitle display region overlaps the key region.

In an example implementation, the determining the subtitle display region in the region in the video frame other than the key region according to the subtitle information includes:

determining the subtitle display region in the region in the video frame other than the key region according to the subtitle content in the subtitle information.

According to an example embodiment of the present disclosure, a subtitle displaying apparatus is provided, including:

a subtitle information determining module configured to determine subtitle information of a video frame in a video when a play request for the video is received;

a key region determining module configured to identify a key region in the video frame;

a display region determining module configured to determine a subtitle display region in a region in the video frame other than the key region; and a play module configured to display subtitle content in the subtitle information in the subtitle display region during playing the video.

In an example implementation, the key region determining module includes:

a first key region determining sub-module configured to identify the key region in the video frame by using a deep learning algorithm.

In an example implementation, the first key region determining sub-module includes:

a target object determining sub-module configured to determine a target object in the video frame by using the deep learning algorithm; and a second key region determining sub-module configured to determine a display region where the target object is located as the key region.

In an example implementation, the second key region determining sub-module includes:

a key part determining sub-module configured to determine a key part of the target object by using the deep learning algorithm; and a third key region determining sub-module configured to determine a display region where the key part is located as the key region.

In an example implementation, the target object includes a face, and the target object determining sub-module includes:

a face detecting sub-module configured to detect the video frame by using a face recognition algorithm to obtain the face.

In an example implementation, the key region determining module includes:

a traversing sub-module configured to traverse the video frame with a key window, and determine a region where the key window is located as a candidate region, wherein the area of the key window is less than that of the video frame;

a feature extracting sub-module configured to extract features in the candidate region, and determine whether the candidate region includes the target object according to the extracted features; and a fourth key region determining sub-module configured to determine the candidate region as the key region when the candidate region includes the target object.

In an example implementation, the key region determining module includes:

a fifth key region determining sub-module configured to determine the key region in the video frame by using the deep learning algorithm when the video frame is a close-shot picture of a video frame previous or preceding to the video frame.

In an example implementation, the display region determining module includes:

a first display region determining sub-module configured to determine the subtitle display region in the region in the video frame other than the key region according to the subtitle information.

In an example implementation, the subtitle information includes an original subtitle display region in the video frame, and the first display region determining sub-module includes:

a second display region determining sub-module configured to adjust the original subtitle display region to the region in the video frame other than the key region when the original subtitle display region overlaps the key region.

In an example implementation, the second display region determining sub-module includes:

a third display region determining sub-module configured to divide the original subtitle display region into at least two display sub-regions and adjust the at least two display sub-regions to the region in the video frame other than the key region when the original subtitle display region overlaps the key region.

In an example implementation, the first display region determining sub-module includes:

a fourth display region determining sub-module configured to determine the subtitle display region in the region in the video frame other than the key region according to the subtitle content in the subtitle information.

According to an example embodiment of the present disclosure, a subtitle displaying apparatus is provided, including:

a processor; and a memory configured to store instructions executable by the processor, wherein the processor is configured to perform the subtitle displaying method described in the foregoing.

According to an example embodiment of the present disclosure, one or more non-volatile computer readable storage medium having computer-readable instructions stored thereon is provided, wherein when the computer-readable instructions are executed by one or more processors, the subtitle displaying method described in the foregoing is implemented.

In embodiments of the present disclosure, subtitle information is determined in a video frame when a play request for a video is received, and after a key region is determined in the video frame, a subtitle display region is determined in a region in the video frame other than the key region. According to the embodiments of the present disclosure, the video is processed online in real time, and the key region in the video frame is automatically identified during playing the video. Therefore, the subtitle will not block display content in the key region in the played video frame, thus improving viewing experience of a viewer.

The features and aspects of the present disclosure will become clear according to the following detailed description of example embodiments with reference to accompanying drawings.

BRIEF DESCRIPTION OF THE DRAWINGS

The accompanying drawings included in this application constitute a part of this application, which show example embodiments, features and aspects of the present disclosure. In order to illustrate the technical solutions in the example embodiments of the present disclosure more clearly, the following briefly describes the accompanying drawings which aid in describing the example embodiments. Apparently, the accompanying drawings in the following description merely show some of the example embodiments of the present disclosure, and are not intended to limit the scope of the present disclosure.

DETAILED DESCRIPTION

Figure 1:
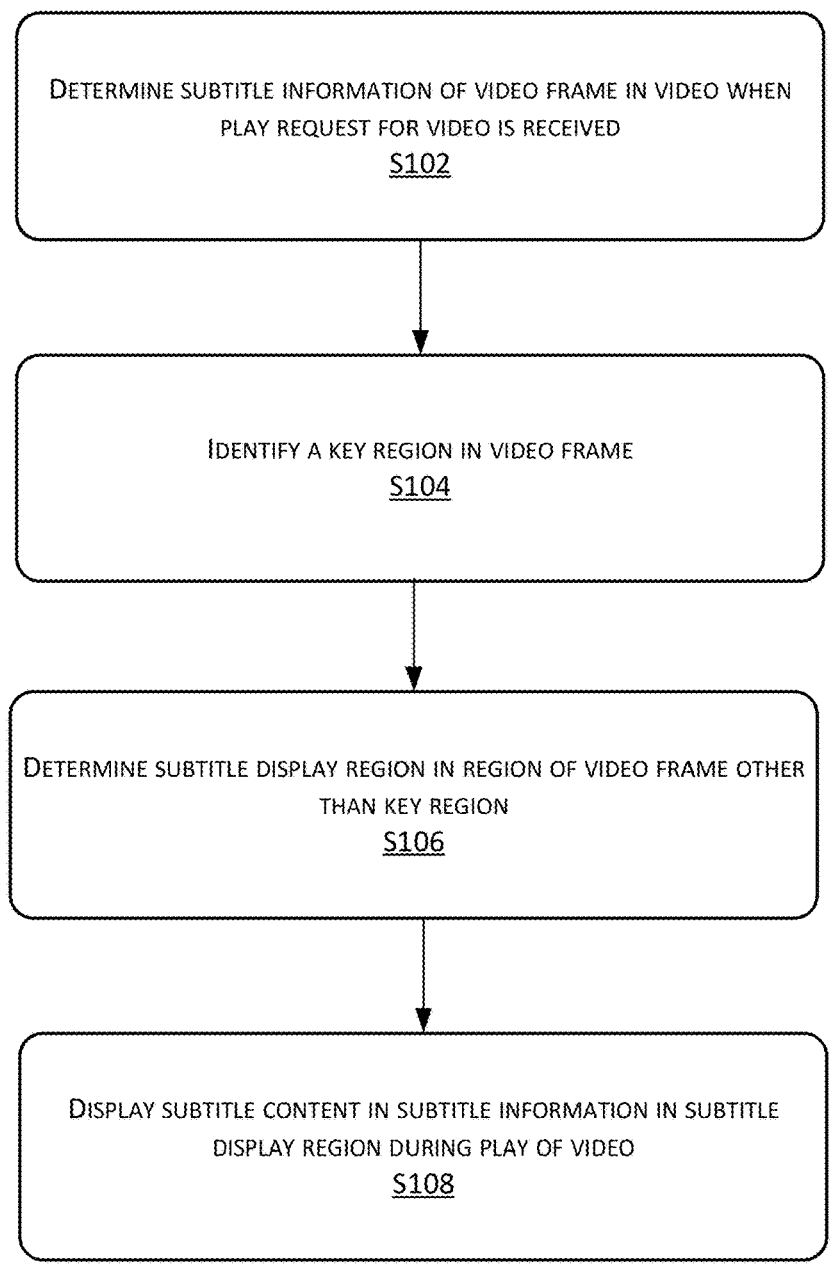
FIG. 1 is a flowchart of a subtitle displaying method according to an embodiment of the present disclosure.

Various example embodiments, features, and aspects of the present disclosure will be illustrated below in detail with reference to the accompanying drawings. The same reference numerals in the accompanying drawings indicate the same or similar elements. Various aspects of the embodiments are shown in the accompanying drawings; however, the accompanying drawings are not necessarily drawn to scale, unless otherwise specified.

Here, the term "example" or "exemplary" means "being used as an example, embodiment, or being illustrative." Here, any embodiment illustrated as "example" or "exemplary" should not be explained as being superior to or better than other embodiments.

In addition, numerous specific details are provided in the following specific implementations to better illustrate the present disclosure. Those skilled in the art should understand that the present disclosure may still be implemented without some specific details. In some examples, methods, measures, elements and circuits well-known to those skilled in the art are not described in detail, thus highlighting the gist of the present disclosure.

FIG. 1 is a flowchart of a subtitle displaying method according to an embodiment of the present disclosure. As shown in FIG. 1, the subtitle displaying method includes the following steps.

In step S102, subtitle information of a video frame in a video is determined when a play request for the video is received.

In an example implementation, the video may be a live video played during shooting, or a recorded video that has been shot; and may be a video shot by a shooting device, or a video made by manual drawing or a computer device. The type and format of the video are not limited in the present disclosure.

A video frame may include a frame picture in the video. The video frame may include a video frame of a two-dimensional video, or a video frame of a multi-dimensional video. The video frame may include a colored video frame, a black-and-white video frame, or a monochromatic video frame.

Subtitle information may merely include subtitle content. A subtitle may be added to the video frame after a display position of the subtitle is determined as required, or the subtitle may be displayed in a determined display position during playing the video. frame.

The subtitle information may also include the subtitle content and display position information of the subtitle. The subtitle may be added to the video frame according to the display position information of the subtitle, or the subtitle may be displayed in a position determined by the display position information during playing the video. frame.

The subtitle information may be in a form of a file separate from a file where the video frame is located, or included in the file of the video frame.

In step S104, a key region in the video frame is identified.

In an example implementation, the key region may be a region including key content of the video frame. The key content may be determined according to display content in the video frame, and the key region in the video frame is determined according to the key content.

The display content in the video frame may include a body and a background. The body in the video frame may be determined as the key content of the video frame, and a display region corresponding to the body may be determined as the key region in the video frame. For example, a video frame A is a picture of an autodrome, a body in the video frame A is a racing car, and the background includes a racing track and the sky. The racing car may be determined as the key content of the video frame, and a display region corresponding to the racing car may be determined as the key region in the video frame.

Display content in the video frame that a viewer may be interested in may also be determined as the key content of the video frame. The key content that the viewer may be interested in may be preset as required. For example, in the video frame A, there is a drone for aerophotography or a piece of cloud in the sky of the background may be the content of interest of the viewer. The drone or cloud may be determined as the key content in the video frame A, and a display region corresponding to the drone or cloud is determined as the key region in the video frame A.

When a play request for the video is received, the key content in the video frame may be identified by a technology such as image recognition or a deep learning algorithm, and the key region in the video frame is determined according to the recognized key content.

In step S106, a subtitle display region is determined in a region in the video frame other than the key region.

In an example implementation, when the video frame includes the key region, the viewer will focus his/her sight on the key content in the key region. The key region may appear at any position in the video frame, and the viewer will have poor viewing experience if the key region is blocked by the subtitle.

In an example implementation, the subtitle display region may be determined in the region in the video frame other than the key region without considering the subtitle information. The subtitle display region may be determined according to preset parameters (such as a size and a position).

The preset size parameter allows the determined subtitle display region to have enough subtitle displaying space, and all of the words in the subtitle content may be completely displayed in the subtitle display region regardless of the number of the words. The preset position parameter allows the subtitle display region to bring desirable viewing experience to the viewer because of the fixed display position while not blocking the key region in the video frame. For example, the subtitle display region may be determined in a region of the lower one-third part of the video frame, or may be determined in a region of the right one-fourth part of the video frame. The subtitle display regions of different video frames may have the same position or different positions.

In an example implementation, the subtitle display region may be determined in the region in the video frame other than the key region according to the subtitle information. For example, when the subtitle displayed according to the display position information in the subtitle information may block the key region, the subtitle display position determined according to the display position information may be adjusted to the region in the video frame other than the key region, such that the subtitle displayed in the adjusted subtitle display region will not block the key content in the video frame.

In step S108, the subtitle content in the subtitle information is displayed in the subtitle display region during playing the video.

In an example implementation, updated subtitle information may be acquired according to the subtitle content and the subtitle display region determined in this embodiment. The updated subtitle information may be in a form of a file separate from a file where the video frame is located, or included in the file where the video frame is located. During playing the video. frame, the subtitle content may be retrieved according to the updated subtitle information, and displayed in the determined subtitle display region.

The subtitle content may further be embedded in the video frame to serve as an embedded subtitle according to the determined subtitle display region. The subtitle is played while the video frame is played back, and the subtitle will not block the key content.

The above subtitle displaying method may be performed by a server providing the video frame, or by a terminal for playing back the video frame. The entity performing the above subtitle displaying method is not limited in the present disclosure. For example, when step S108 is performed by the server, the server may control the terminal to display the subtitle content from the subtitle information in the subtitle display region during playing the video.

In this embodiment, the subtitle information is determined in the video frame when the play request for the video is received, and after the key region is determined in the video frame, the subtitle display region may be determined in the region in the video frame other than the key region. During playing the video, the subtitle display region is determined in the region other than the key region, such that display content in the key region may be protected from being blocked by the subtitle, thus improving viewing experience of viewers.

In this embodiment, real-time adjustment of the subtitle may be implemented during playing the video. For example, in a live program such as news report, the video frame may be a live picture. The live picture in the video may be processed in real time. A subtitle display region is determined in real time in the shot live picture, the live picture is played and a subtitle is displayed in the determined subtitle display region. As such, the subtitle in the live picture of the live program does not block a key region, thus improving the viewing performance of the live program.

Figure 2:
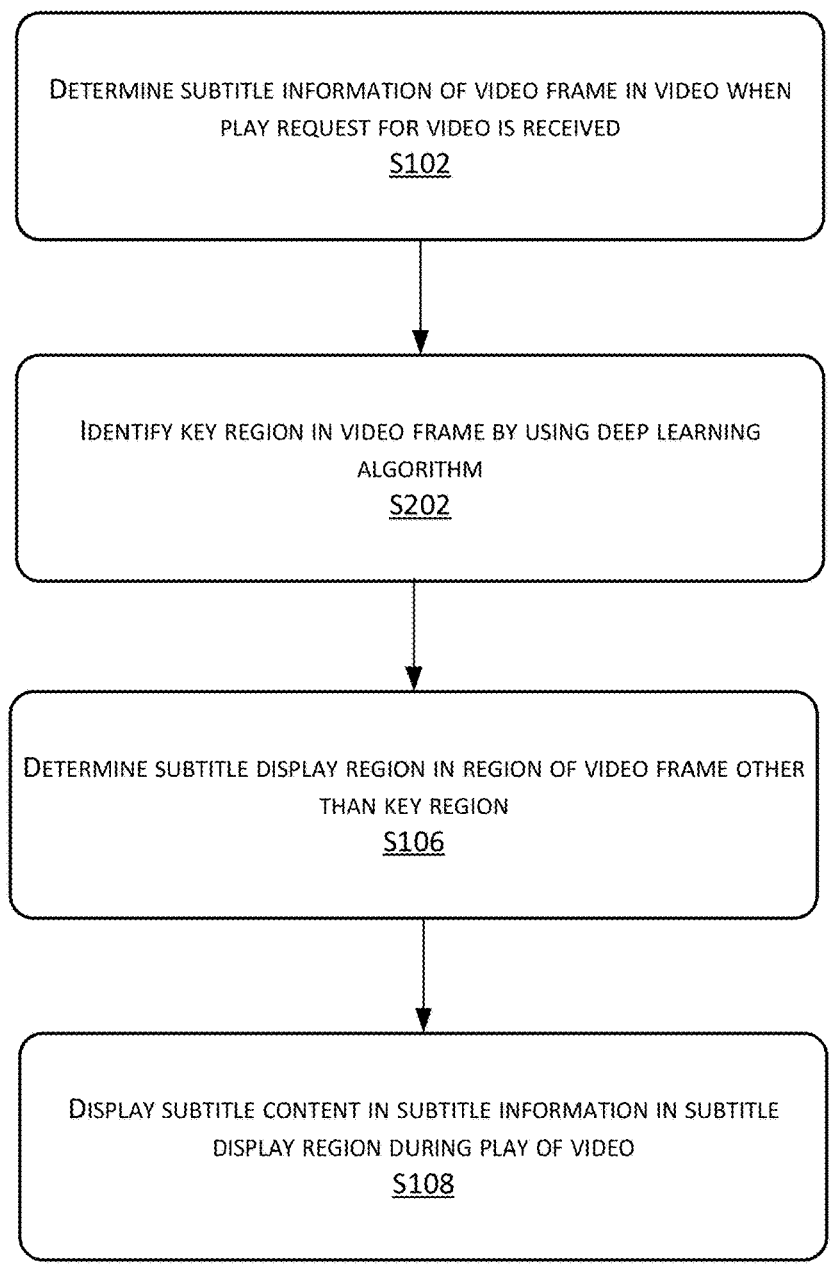
FIG. 2 is a flowchart of a subtitle displaying method according to an embodiment of the present disclosure.

FIG. 2 is a flowchart of a subtitle displaying method according to an embodiment of the present disclosure. As shown in FIG. 2, step S104 in the subtitle displaying method includes the following steps.

In step S202, the key region in the video frame is identified by using a deep learning algorithm.

In an example implementation, an image may be expressed in various manners. For example, an image may be expressed as a vector of an intensity value of each pixel, a series of edges in different shapes, or multiple sub-regions in specific shapes. Low-level features (such as the vector of the intensity value of each pixel) in the image may be combined to form a high-level feature or a high-level attribute category of the image (an object attribute or feature in the image, e.g., the object in the image is a cat). Efficient algorithms such as low-level feature learning and layered feature extraction may be used in the deep learning to obtain the high-level feature. By using the deep learning, a learning task (such as face recognition or facial expression recognition) may be accomplished according to an instance (e.g., the image) with some specific expressing methods, thus obtaining the high-level feature of the instance (recognizing the face or determining that the facial expression is a smile). The specific implementation of the deep learning algorithm is not limited in the present disclosure.

The key content may be determined in the video frame by using the deep learning algorithm. For example, a body or the key content that the viewer may be interested in may be recognized from the video frame by using the deep learning algorithm. The key region may be determined in the video frame according to the key content. One or more key regions may be included in one video frame. The key regions may have the same size and shape or different sizes and shapes. The sizes and shapes of the key regions may be set as required.

In this embodiment, the key region may be determined in the video frame by using the deep learning algorithm. The processing efficiency of determining the key region may be improved by using the deep learning algorithm. The subtitle display region is determined in the region other than the key region, such that display content in the key region may be protected from being blocked by the subtitle, thus improving viewing experience of viewers.

Figure 3:
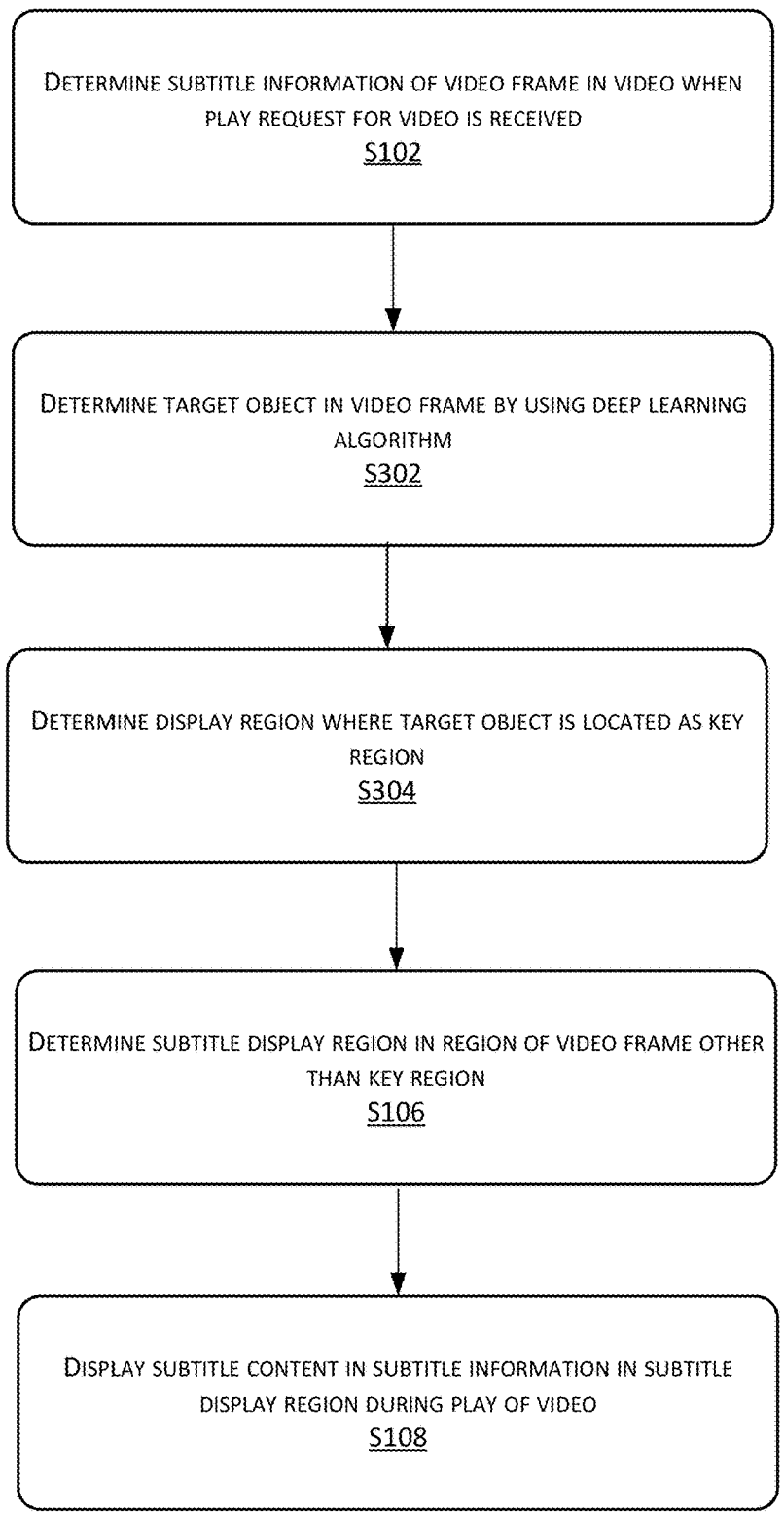
FIG. 3 is a flowchart of a subtitle displaying method according to an embodiment of the present disclosure.

In an example implementation, the video frame in the video may be processed in real time by powerful processing capability of the deep learning algorithm, including determining the key region in the video frame in real time, and playing the video frame in real time, wherein the video frame played in real time includes a subtitle not blocking the key region. FIG. 3 is a flowchart of a subtitle displaying method according to an embodiment of the present disclosure. As shown in FIG. 3, step S202 in the subtitle displaying method includes the following steps.

In step S302, a target object in the video frame is determined by using the deep learning algorithm.

In an example implementation, the target object in the video frame may be determined as required. The target object may be different types of objects such as humans, animals, plants, vehicles, buildings, and natural landscapes. The target object may also be set parts of different types of objects such as human faces, human legs, and animal faces.

One or more types of objects may be determined as the target object according to the display content of the video frame. For example, the body in the video frame may be determined as the target object.

The target object in the video frame may be determined by using the deep learning algorithm. For example, the video frame includes a human, a vehicle, and a building. The human and the vehicle may be determined as the target objects. A deep learning neural network may be trained by using sample images including humans or vehicles. The deep learning neural network may be a neural network for recognizing target objects by using the deep learning algorithm. The human and the vehicle may be recognized from the image by the trained deep learning neural network. A video frame B is input to the trained deep learning neural network, and the human and vehicle may be determined from the video frame B according to a result output by the deep learning neural network.

In an example implementation, the target object includes a face, and the determining a target object in the video frame by using the deep learning algorithm includes:

detecting the video frame by using a face recognition algorithm to obtain the face.

In an example implementation, the deep learning algorithm may include a face recognition algorithm. The face recognition algorithm may include: a facial-feature-based recognition algorithm, a whole-face-image-based recognition algorithm, a template-based recognition algorithm, and a recognition algorithm using a neural network.

Whether there is a face in the video frame may be detected by face detection using the face recognition algorithm, the face may be detected from the video frame, and a position of the face in the video frame may be located. For example, the video frame may be detected by using an Eigenface-based face recognition algorithm to obtain the face. The implementation of the face recognition algorithm is not limited in the present disclosure.

The face may include a human face. The face recognition algorithm may include a human face recognition algorithm.

In step S304, a display region where the target object is located is determined as the key region.

In an example implementation, after the target object is determined in the video frame, the display region where the target object is located may be determined as the key region. The key region may have substantially the same size and shape as the display region where the target object is located. The key region may also be in a preset shape, e.g., a rectangular shape.

In this embodiment, the target object is determined in the video frame by using the deep learning algorithm, and the display region where the target object in the video frame is determined as the key region. The key region determined according to the target object is highly targeted and has an accurate positioning result.

In an example implementation, step S304 in the subtitle displaying method includes:

determining a key part of the target object by using the deep learning algorithm; and determining a display region where the key part is located as the key region.

In an example implementation, when a large target object is determined in the video frame (that is, the proportion of the target object in the video frame exceeds a threshold), or multiple target objects are determined in the video frame, the proportion of the key region in the video frame is also large, finally resulting in an undesirable display position of the subtitle. For example, a video frame C is a close-shot of a racing car picture, and a display region where the racing car is located occupies 80% of the area in the video frame C. If the key region is determined merely according to the target object, the subtitle may only be displayed on two lateral sides or at the top of the video frame, and the display position of the subtitle is undesirable. The viewer will have poor viewing experience.

A key part of the target object may be determined by using the deep learning algorithm. For example, when the target object is a human, the facial expression and body movements of the human are generally key content in the video frame, and parts such as the face and the hands of the human may be determined as the key parts. When the target object is a human face, parts such as the mouth and the eyes on the face may also be determined as the key parts. When the target object is a racing car, a driver, a car logo, an image of the car body, or a wheel may be determined as the key part.

In an example implementation, when the key region determined according to the key part still occupies a large area in the video frame, a sub-part may be further determined in the key part, and a display region where the sub-part is located is determined as the key region. For example, the target object is a human and the key part is the face, but the display region where the face is located still occupies 50% of the video frame. A region where a sub-part on the face, such as the mouth and the eyes, is located may be further determined as the key region.

There may be one or more key parts of the target object. The key part of the target object may be determined as required. After the key part is determined, the display region where the key part is located is determined as the key region.

In this embodiment, the key part is determined in the target object by using the deep learning algorithm, and the display region where the key part of the target object is located may be determined as the key region. The key region determined according to the key part is more highly targeted. The key region has a desirable proportion in the video frame. The final display position of the subtitle in the video frame is more desirable.

Figure 4:
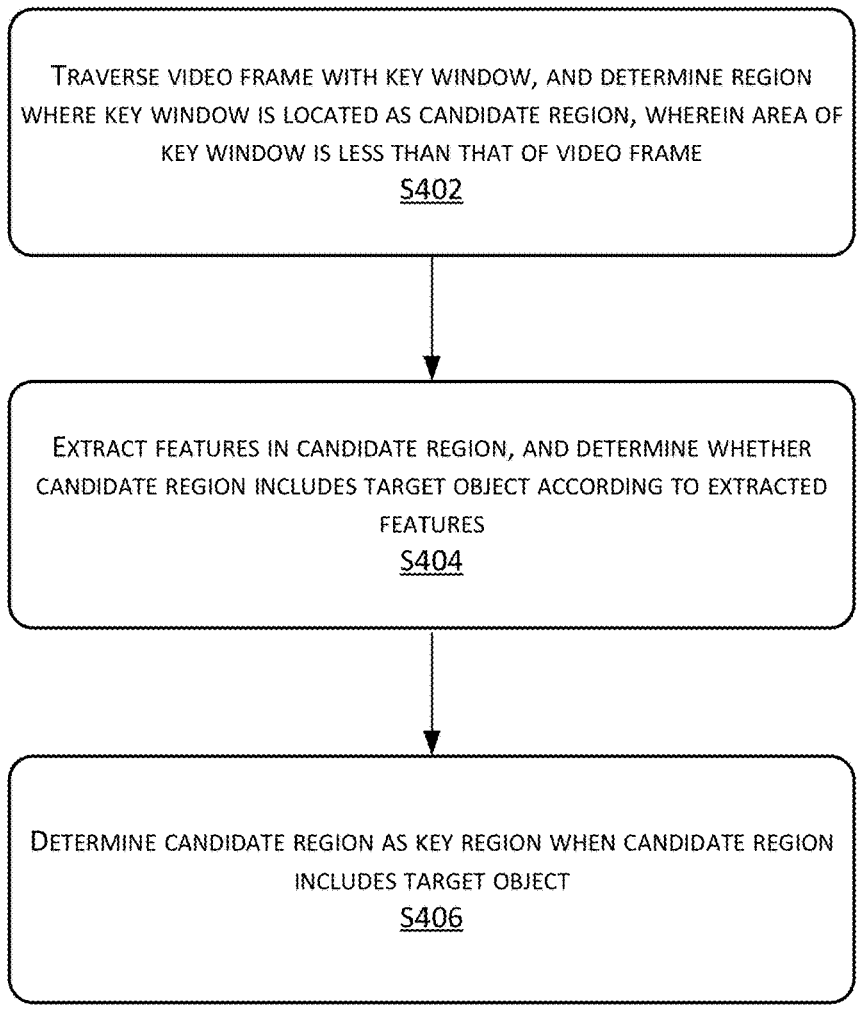
FIG. 4 is a flowchart of step S104 in a subtitle displaying method according to an embodiment of the present disclosure.

FIG. 4 is a flowchart of step S104 in a subtitle displaying method according to an embodiment of the present disclosure. As shown in FIG. 4, step S104 in the subtitle displaying method includes the following steps.

In step S402, the video frame is traversed with a key window, and a region where the window is located is determined as a candidate region, wherein the area of the window is less than that of the video frame. Such window may be referred to as a key window.

In an example implementation, the key window includes a window having a preset size and/or preset shape. The size of the key window may be determined according to the size of the video frame. For example, the size of the video frame is 272 mm*204 mm, and the key window may be in a rectangular shape and in the size of 27 mm*20 mm.

The video frame may be traversed using the key window according to a set step length, and regions corresponding to the video frame in the key window are determined as the candidate regions. For example, a key window 1 is slid in a video frame D according to a set step length of 1 mm, and the video frame D is traversed to obtain M candidate regions in total.

The size of the key window may basically include the whole of the target object in the video frame. The size of the key window may be adjusted according to different content of the video frame.

Multiple key windows in different sizes may be used to traverse one or more video frames to obtain candidate regions.

Content in the candidate regions may or may not overlap.

In step S404, features in the candidate region are extracted, and whether the candidate region includes the target object is determined according to the extracted features.

In an example implementation, the features in the candidate region may be extracted by using the deep learning algorithm, and the extracted features are compared with features of the target object. It may be determined whether the candidate region includes the target object according to comparison results.

For example, a video frame E includes the sky, grassland, and a running horse. The target object is the horse. N candidate regions may be obtained by traversing the video frame E using the key window. The N candidate regions are input to the deep learning neural network. The deep learning neural network may extract features in the candidate regions, compare the extracted features with features of the horse, and determine whether the candidate regions include the horse according to the comparison results.

In step S406, the candidate region is determined as the key region when the candidate region includes the target object.

In an example implementation, it may be determined that the target object horse is included in the $K^{th}$ candidate region according to the output result of the deep learning neural network. The $K^{th}$ candidate region may be determined as the key region.

In this embodiment, the candidate regions may be determined in the video frame according to the key window, and after the features of the candidate regions are extracted according to the deep learning algorithm, it is determined whether the candidate regions include the target object. The candidate region including the target object is determined as the key region. The processing efficiency of determining the key region in the video frame may be improved by window traversal and feature extraction in the deep learning algorithm.

Figure 5:
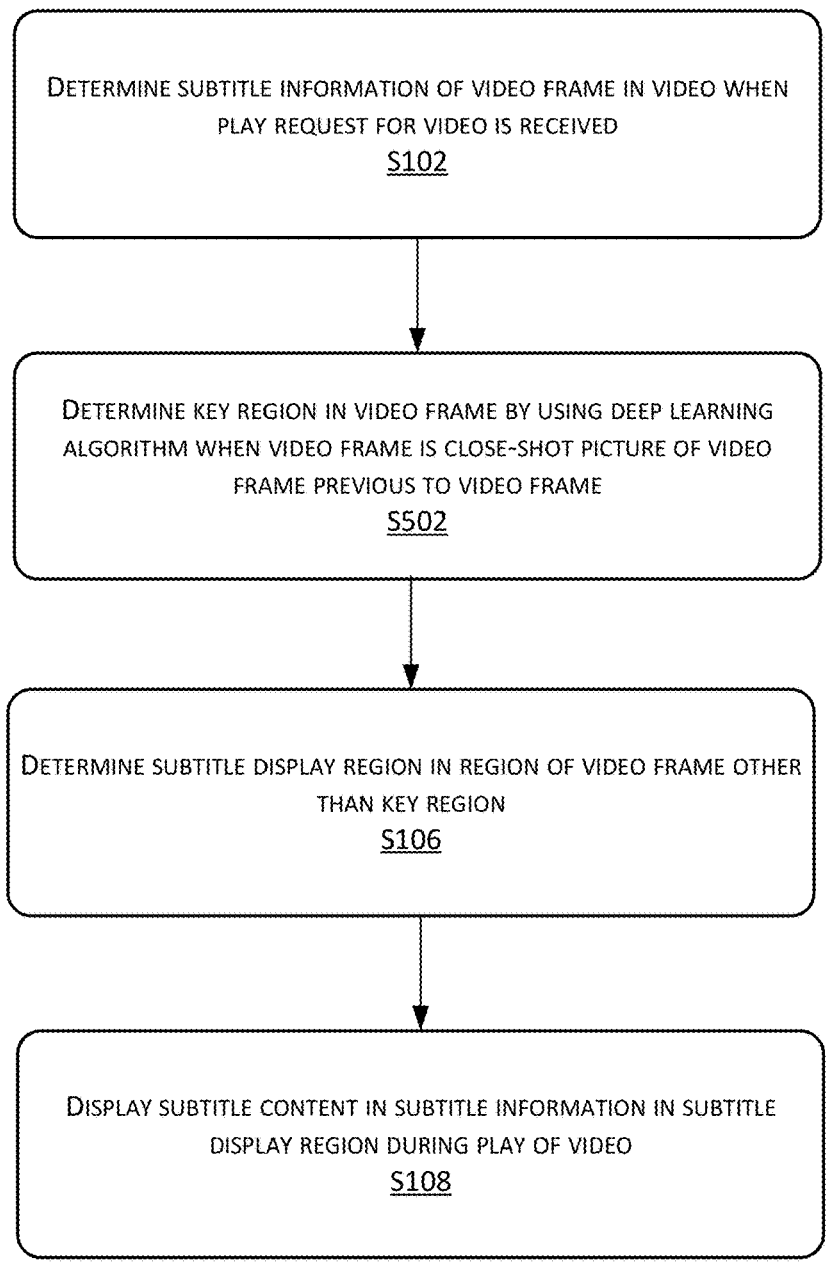
FIG. 5 is a flowchart of a subtitle displaying method according to an embodiment of the present disclosure.

FIG. 5 is a flowchart of a subtitle displaying method according to an embodiment of the present disclosure. As shown in FIG. 5, step S104 in the subtitle displaying method includes the following steps.

In step S502, the key region in the video frame is determined by using the deep learning algorithm when the video frame is a close-shot picture of a video frame previous or preceding to the video frame.

In an example implementation, the same object in the video to which the video frame belongs may be presented with long shot or close shot. When a long shot is taken, the target object is far from a shooting device, the target object occupies a small area in the shot video frame, and the long-shot video frame generally includes the overall target object. When a close shot is taken, the target object is near the shooting device, the target object occupies a large area in the shot video frame, and the close-shot video frame generally includes only a part of the target object. Therefore, the close-shot video frame generally has more detailed content than the long-shot video frame.

It may be determined whether the video frame is a close-shot picture of a previous video frame by recognizing the display content in the video frame. For example, it may be determined whether the video frame is a close-shot picture of the previous video frame according to whether the video frame and the previous video frame include the same target object and whether a display region area in the video frame occupied by the target object is greater than that in the previous video frame occupied by the target object.

When the video frame is the close-shot picture of the previous video frame, the key region needs to be determined in the video frame to prevent the subtitle from blocking the detailed content in the video frame.

In an example implementation, when the video frame is not the close-shot picture of a video frame previous or preceding to the video frame and there is no key region in the previous video frame, the key region may not be determined in the video frame.

In this embodiment, when the video frame is the close-shot picture of a video frame previous or preceding to the video frame, the key region is determined in the video frame. It may be conveniently determined, according to an association between the video frame and the previous video frame, whether the key region needs to be determined in the video frame, thus improving the performing efficiency of the embodiment in the present disclosure.

Figure 6:
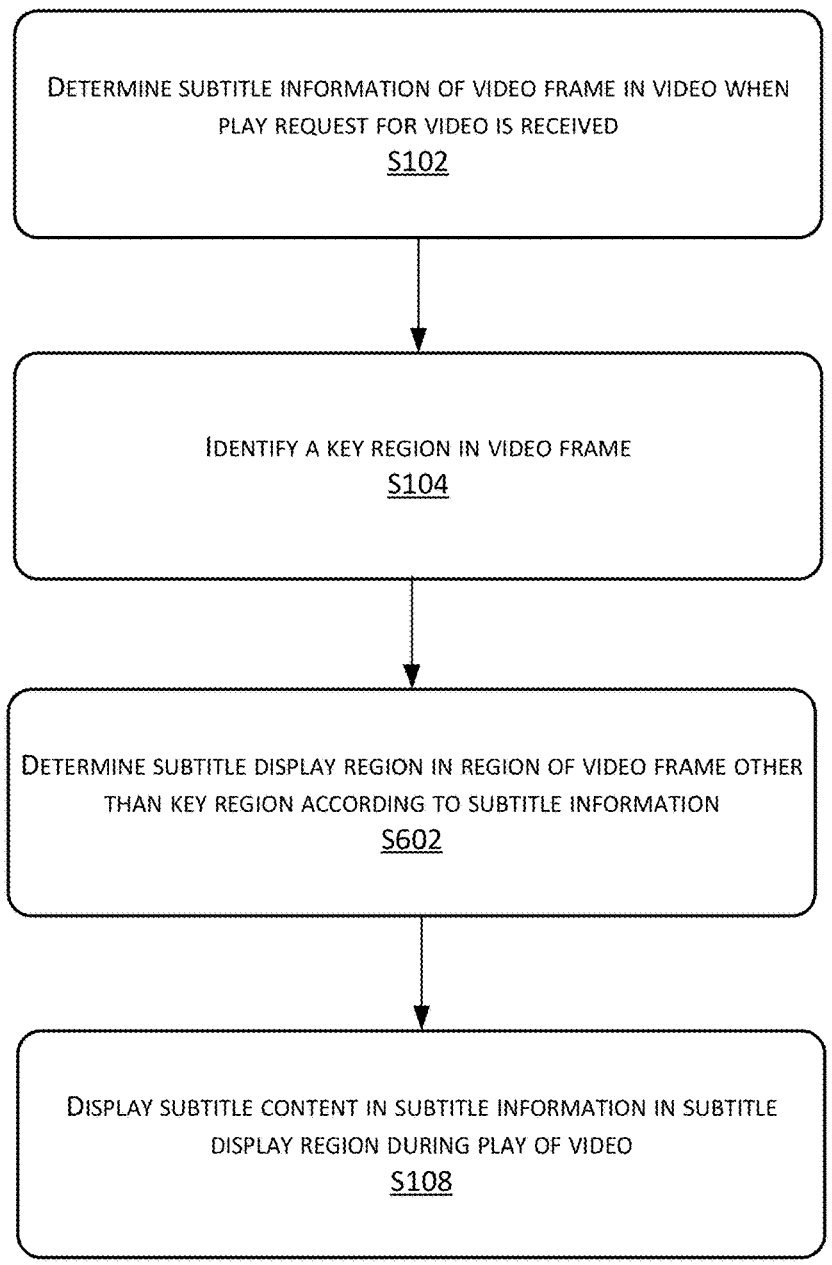
FIG. 6 is a flowchart of a subtitle displaying method according to an embodiment of the present disclosure.

FIG. 6 is a flowchart of a subtitle displaying method according to an embodiment of the present disclosure. As shown in FIG. 6, step S106 in the subtitle displaying method includes the following steps.

In step S602, the subtitle display region is determined in the region in the video frame other than the key region according to the subtitle information.

In an example implementation, the subtitle display region may be determined in the region in the video frame other than the key region only according to the subtitle content in the subtitle information. For example, the subtitle display region may be determined in the region other than the key region according to the number of words in the subtitle content. The position of the subtitle display region may also be set more flexibly while it may be ensured that the subtitle display region have enough space for displaying the subtitle clearly.

In an example implementation, the subtitle display region may also be determined in the region in the video frame other than the key region according to the subtitle content and display position information in the subtitle information. When the subtitle displayed according to the display position information in the subtitle information may block the key region, a subtitle display region of which the size is proportional to the number of words may be directly determined in the region in the video frame other than the key region according to the number of words in the subtitle content. The subtitle display region determined according to the display position information in the subtitle information may also be adjusted to the region in the video frame other than the key region.

When the subtitle displayed according to the display position information in the subtitle information will block the key region, the subtitle display position determined according to the display position information may not be adjusted, and the final subtitle display region is determined directly according to the display position information. The subtitle display region determined according to the display position information may also be adjusted to another region in the video frame other than the key region.

In this embodiment, the subtitle display region is determined in the region in the video frame other than the key region according to the subtitle information. The subtitle in the video frame will not block the key content, and the position and size of the subtitle display region may be set more flexibly.

In an example implementation, the subtitle information includes an original subtitle display region in the video frame, and step S602 in the subtitle displaying method includes:

adjusting the original subtitle display region to the region in the video frame other than the key region when the original subtitle display region overlaps the key region.

In an example implementation, the display region of the subtitle in the video frame has been determined when the subtitle information includes the display position information of the subtitle. The display position information of the subtitle may include the original subtitle display region.

In an example implementation, the subtitle will block the key content in the key region when the original subtitle display region overlaps the key region. The original subtitle display region may be moved to the region in the video frame other than the key region, thus obtaining the adjusted subtitle display region.

The overall original subtitle display region may be adjusted to any region or a region in a set range of the video frame other than the key region. The original subtitle display region may be adjusted upward, downward, or toward any direction, such that the adjusted subtitle display region does not overlap the key region.

If the position of the adjusted subtitle display region is adjusted too much, when the video frame is viewed, the subtitle display region may be greatly different from the subtitle position in the previous video frame, such that the viewer has poor viewing experience. The original subtitle display region may be adjusted according to a set moving direction, e.g., adjusted downward. The original subtitle display region may be adjusted according to a set moving distance. For example, the original subtitle display region may be moved by 1 cm. The original subtitle display region may also be moved to a set position or the subtitle may be displayed according to a set display direction. For example, the original subtitle display region may be moved to the rightmost side of a screen to display the subtitle vertically.

In an example implementation, when the original subtitle display region overlaps the key region, the subtitle display region may be re-determined in the region in the video frame other than the key region merely according to the subtitle content in the subtitle information while the display position information of the subtitle is omitted.

In an example implementation, the adjusting the original subtitle display region to the region in the video frame other than the key region when the original subtitle display region overlaps the key region includes:

dividing the original subtitle display region into at least two display sub-regions and adjusting the at least two display sub-regions to the region in the video frame other than the key region when the original subtitle display region overlaps the key region.

In an example implementation, the original subtitle display region may be divided into at least two display sub-regions, the display sub-region overlapping the key region is then adjusted to the region in the video frame other than the key region, and the position of the remaining display sub-region is adjusted correspondingly. The subtitle may be displayed in the adjusted display sub-regions according to a normal display order. For example, the adjusted display sub-regions are located on the same horizontal line, which does not affect the viewing experience of the subtitle.

For example, the original subtitle display region may be divided into two display sub-regions, and the two display sub-regions are moved leftward and rightward respectively. The two adjusted display sub-regions may be located at a left adjacent position and a right adjacent position of the key region, respectively, and the two display sub-regions are located on the same horizontal line.

In this embodiment, the original subtitle display region is adjusted to the region in the video frame other than the key region when the original subtitle display region overlaps the key region. By adjusting the original subtitle display region overlapping the key region, the subtitle may be avoided from blocking the display content of the key region, thus providing desirable viewing experience for the viewer.

In an example implementation, step S602 in the subtitle displaying method includes:

determining the subtitle display region in the region in the video frame other than the key region according to the subtitle content in the subtitle information.

In an example implementation, when the subtitle information merely includes the subtitle content, the subtitle display region may be determined in the region in the video frame other than the key region according to the subtitle content. When the subtitle information includes the subtitle content and the display position information, the subtitle display region may also be determined in the region in the video frame other than the key region merely according to the subtitle content.

The subtitle display region of which the size is proportional to the number of words may be determined in the region in the video frame other than the key region according to the number of words in the subtitle content. The subtitle display region of which the size is proportional to the number of words may be determined in a set position of the video frame. For example, the subtitle display region is determined at the one-fourth right side of the video frame. The subtitle display region may also be determined at a corresponding position of the video frame according to the size of the determined subtitle display region. For example, when there are a small number of words in the subtitle content, the determined subtitle display region is small, and the subtitle display region may be determined at the bottom of the video frame. When there are a large number of words in the subtitle content, the determined subtitle display region is large, and the subtitle display region may be determined at the top or two lateral sides of the video frame.

In this embodiment, the subtitle display region is determined in the region in the video frame other than the key region according to the subtitle content. The size of the determined subtitle display region may be more adapted to the number of words in the subtitle content. The position of the subtitle display region may also be set according to different sizes of the determined subtitle display regions.

Application Example

Figure 7:
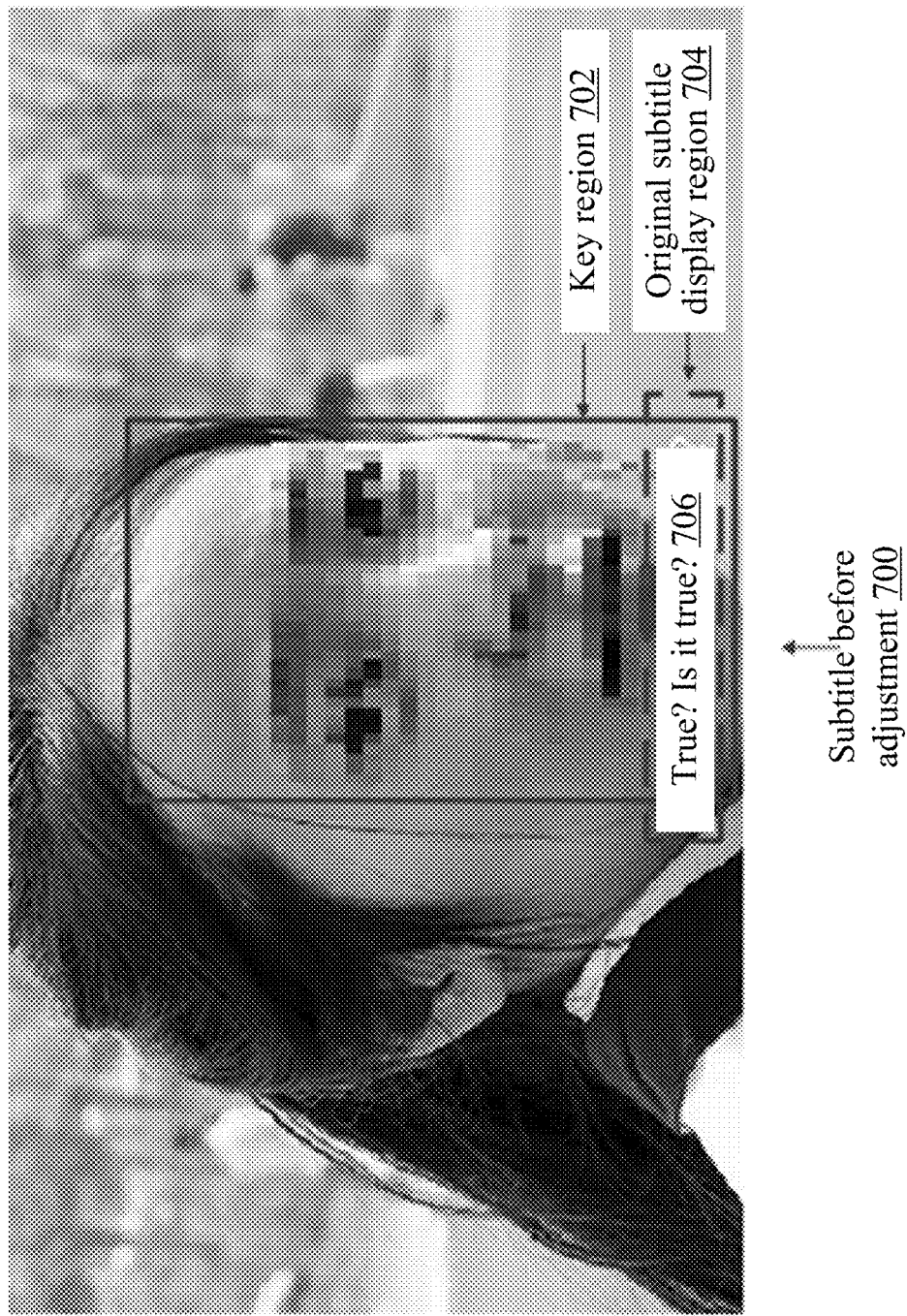
FIG. 7 is a schematic diagram of a subtitle according to an embodiment of the present disclosure before a subtitle is adjusted.

FIG. 7 is a schematic diagram of a subtitle before adjustment 700 according to an embodiment of the present disclosure before a subtitle is adjusted. A human face is determined as one target object and its region is determined as the key region 702. In a video frame A as shown in FIG. 7, subtitle information includes an original subtitle display region 704. When the video frame A is played, the subtitle 706 such as "True? Is it true" displayed in the original subtitle display region blocks a part of the human face, leading to poor viewing experience of a viewer.

Deep learning algorithm may be used to determine that the video frame A includes a human face. A region where the human face is located is determined as the key region 702. In FIG. 7, the original subtitle display region 704 overlaps the key region 702. The original subtitle display region 704 may be adjusted to a region in the video frame A other than the key region 702.

Figure 8:
FIG. 8 is a schematic diagram of a subtitle according to an embodiment of the present disclosure after a subtitle is adjusted.

FIG. 8 is a schematic diagram of a subtitle after adjustment 800 according to an embodiment of the present disclosure after a subtitle is adjusted. As shown in FIG. 8, the position of the original subtitle display region is adjusted, the adjusted subtitle display region is on the right of the human face, and the subtitle 706 no longer blocks the human face. The viewer has desirable viewing experience.

Figure 9:
FIG. 9 is a schematic diagram of another subtitle according to an embodiment of the present disclosure after a subtitle is adjusted.

FIG. 9 is a schematic diagram of a subtitle after adjustment 900 according to an embodiment of the present disclosure after a subtitle is adjusted. As shown in FIG. 9, after the original subtitle display region is divided into two sub-regions, the two sub-regions are adjusted to left and right sides of the key region, respectively. The adjusted subtitle display region includes two sub-regions, and the subtitle will no longer block the human face. The subtitle 706 is correspondingly divided into two pieces 902(1) "True?" and 902(2) "Is it true?" The viewer has desirable viewing experience.

Figure 10:
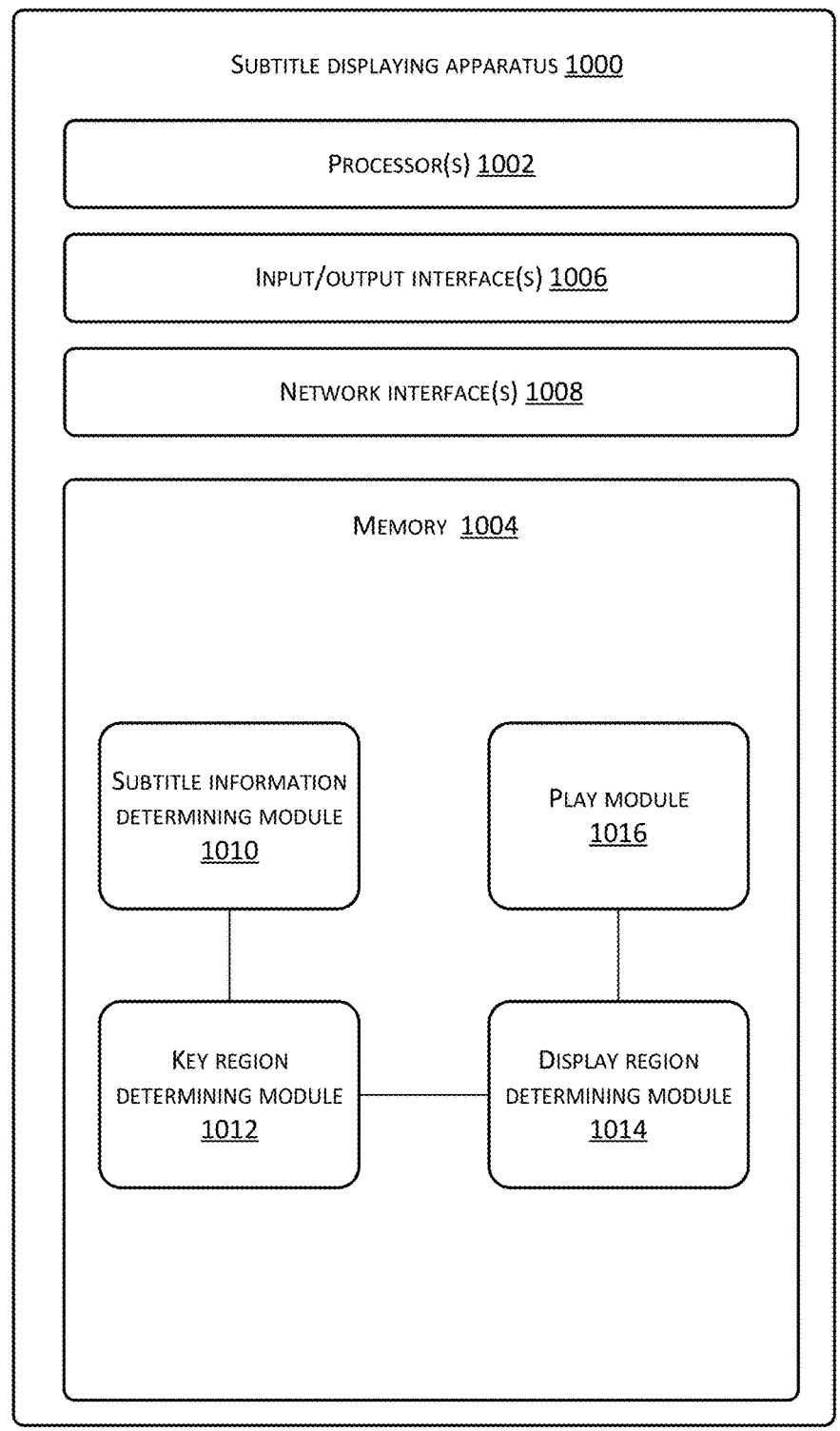
FIG. 10 is a block diagram of a subtitle displaying apparatus according to an embodiment of the present disclosure.

FIG. 10 is a block diagram of a subtitle displaying apparatus 1000 according to an embodiment of the present disclosure. As shown in FIG. 10, the subtitle displaying apparatus 1000 includes one or more processor(s) 1002 or data processing unit(s) and memory 1004. The subtitle displaying apparatus 1000 may further include one or more input/output interface(s) 1006 and one or more network interface(s) 1008. The memory 1004 is an example of computer readable medium or media.

The computer readable medium includes non-volatile and volatile media as well as movable and non-movable media, and may store information by means of any method or technology. The information may be a computer readable instruction, a data structure, and a module of a program or other data. A storage medium of a computer includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and may be used to store information accessible to the computing device. According to the definition in this text, the computer readable medium does not include transitory media, such as a modulated data signal and a carrier.

The memory 1004 may store therein a plurality of modules or units including:

a subtitle information determining module 1010 configured to determine subtitle information of a video frame in a video when a play request for the video is received;

a key region determining module 1012 configured to identify a key region in the video frame;

a display region determining module 1014 configured to determine a subtitle display region in a region in the video frame other than the key region; and a play module 1016 configured to display subtitle content in the subtitle information in the subtitle display region during playing the video.

Figure 11:
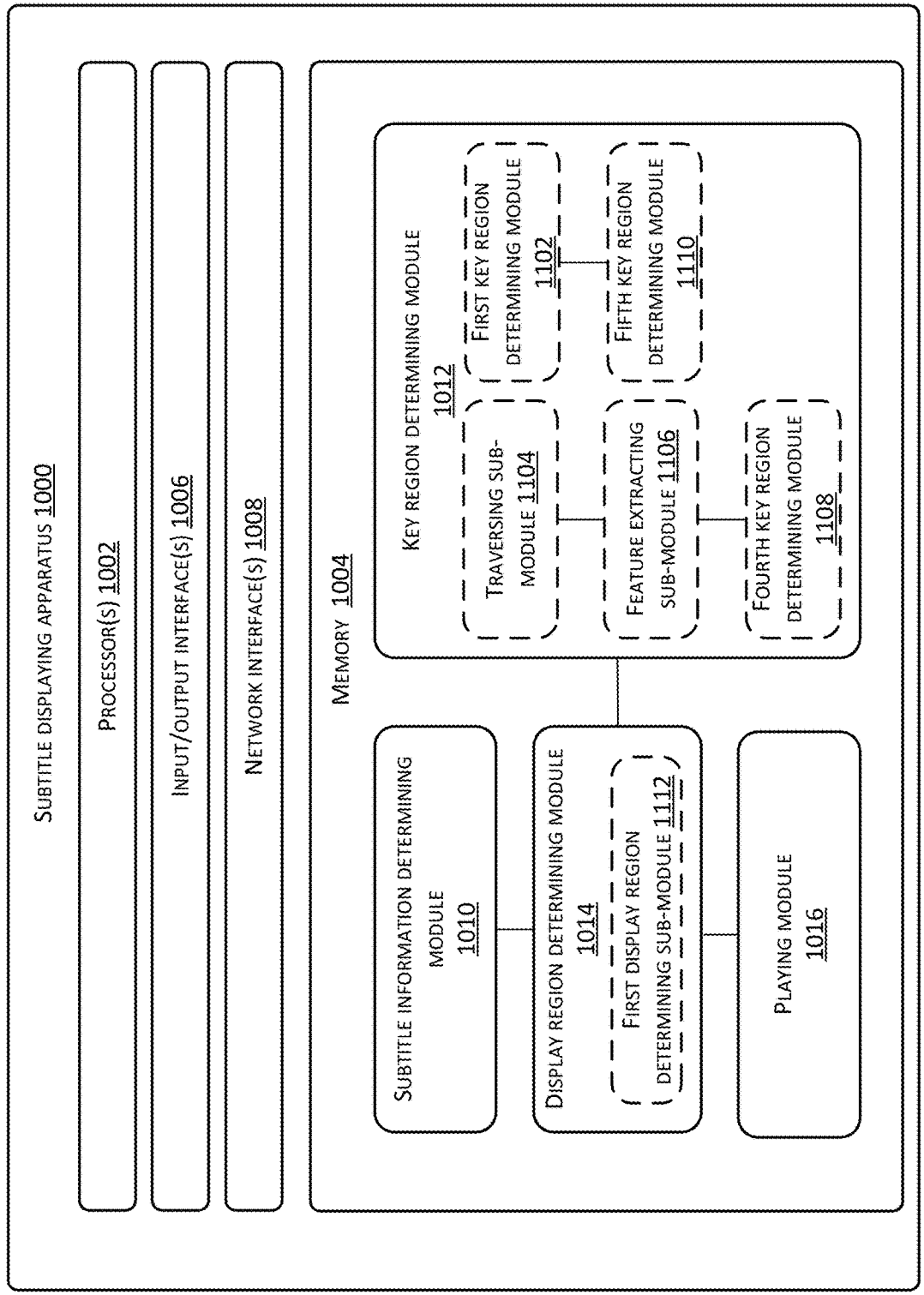
FIG. 11 is a block diagram of a subtitle displaying apparatus according to an embodiment of the present disclosure.

FIG. 11 is a block diagram of a subtitle displaying apparatus according to an embodiment of the present disclosure. As shown in FIG. 11, in an example implementation, the key region determining module 1012 includes:

a first key region determining sub-module 1102 configured to identify the key region in the video frame by using a deep learning algorithm.

In an example implementation, the first key region determining sub-module 1102 includes the following sub-modules (not shown in FIG. 11):

a target object determining sub-module configured to determine a target object in the video frame by using the deep learning algorithm; and a second key region determining sub-module configured to determine a display region where the target object is located as the key region.

In an example implementation, the second key region determining sub-module includes:

a key part determining sub-module configured to determine a key part of the target object by using the deep learning algorithm; and a third key region determining sub-module configured to determine a display region where the key part is located as the key region.

In an example implementation, the target object includes a face, and the target object determining sub-module includes:

a face detecting sub-module configured to detect the video frame by using a face recognition algorithm to obtain the face.

In an example implementation, the key region determining module 1012 includes:

a traversing sub-module 1104 configured to traverse the video frame with a key window, and determine a region where the key window is located as a candidate region, wherein the area of the key window is less than that of the video frame;

a feature extracting sub-module 1106 configured to extract features in the candidate region, and determine whether the candidate region includes the target object according to the extracted features; and a fourth key region determining sub-module 1108 configured to determine the candidate region as the key region when the candidate region includes the target object.

In an example implementation, the key region determining sub-module 1102 includes:

a fifth key region determining sub-module 1110 configured to determine the key region in the video frame by using the deep learning algorithm when the video frame is a close-shot picture of a video frame previous or preceding to the video frame.

In an example implementation, the display region determining module 1014 includes:

a first display region determining sub-module 1112 configured to determine the subtitle display region in the region in the video frame other than the key region according to the subtitle information.

In an example implementation, the subtitle information includes an original subtitle display region in the video frame, and the first display region determining sub-module 1112 includes the following sub-module (not shown in FIG. 11):

a second display region determining sub-module configured to adjust the original subtitle display region to the region in the video frame other than the key region when the original subtitle display region overlaps the key region.

In an example implementation, the second display region determining sub-module includes:

a third display region determining sub-module configured to divide the original subtitle display region into at least two display sub-regions and adjust the at least two display sub-regions to the region in the video frame other than the key region when the original subtitle display region overlaps the key region.

In an example implementation, the first display region determining sub-module 31 includes:

a fourth display region determining sub-module configured to determine the subtitle display region in the region in the video frame other than the key region according to the subtitle content in the subtitle information.

Figure 12:
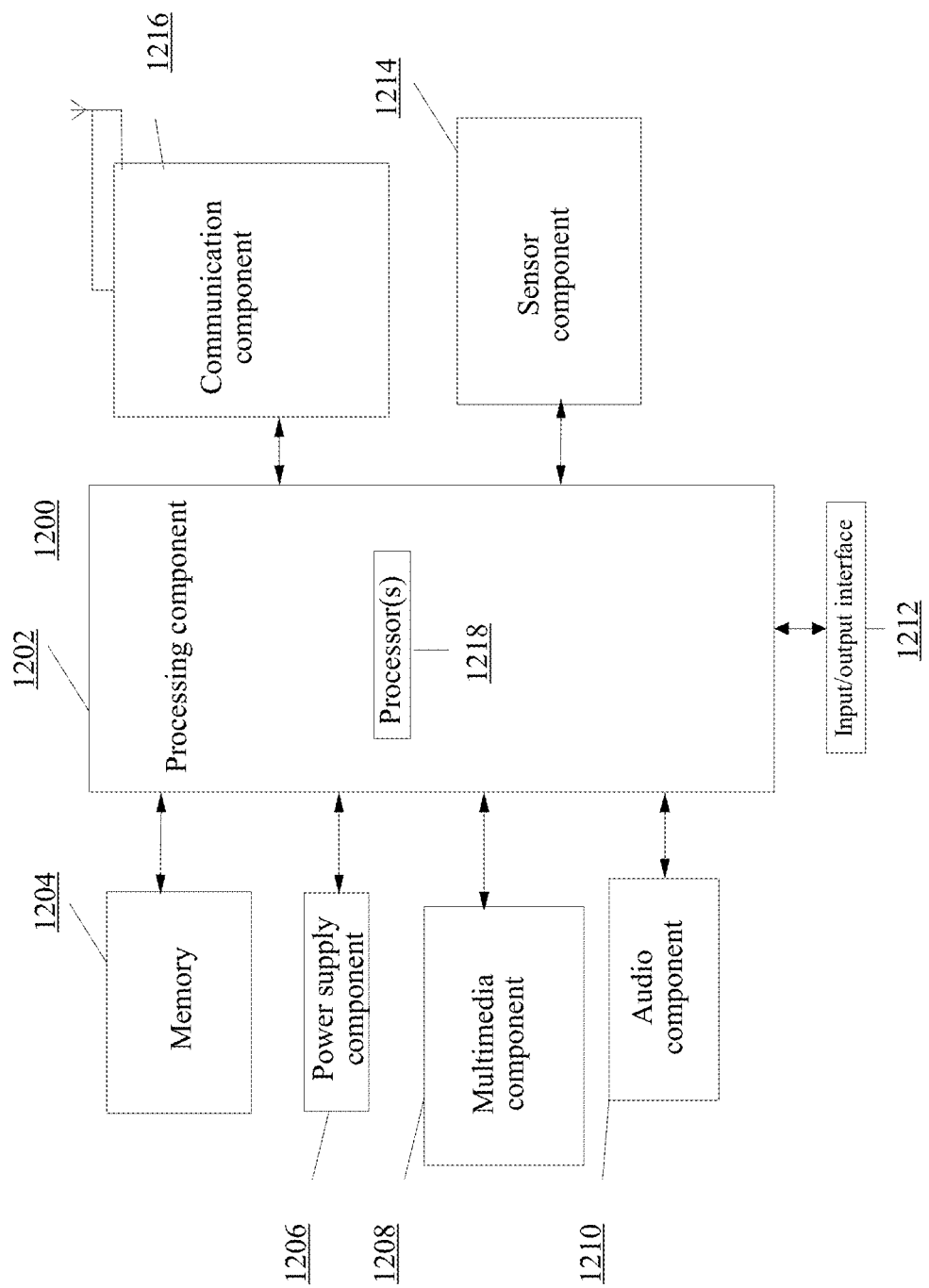
FIG. 12 is a block diagram of an apparatus for displaying a subtitle according to an example embodiment.

FIG. 12 is a block diagram of an apparatus for displaying a subtitle according to an example embodiment. For example, the apparatus 1200 may be a mobile phone, a computer, a digital broadcasting terminal, a message transceiver, a game console, a tablet device, medical equipment, fitness equipment, a personal digital assistant, and the like.

Referring to FIG. 12, the apparatus 1200 may include one or more of the following components: a processing component 1202, a memory 1204, a power supply component 1206, a multimedia component 1208, an audio component 1210, an input/output (I/O) interface 1212, a sensor component 1214, and a communication component 1216.

The processing component 1202 generally controls overall operations of the apparatus 1200, e.g., operations associated with displaying, phone call, data communication, camera operations, and record operations. The processing component 1202 may include one or more processors 1218 to execute instructions to implement all or a part of the steps in the foregoing method. Moreover, the processing component 1202 may include one or more modules, thus facilitating interaction between the processing component 1202 and other components. For example, the processing component 1202 may include a multimedia module, thus facilitating interaction between the multimedia component 1208 and the processing component 1202.

The memory 1204 is configured to store various types of data to support operations in the apparatus 1200. Examples of these types of data include instructions of any application programs or instructions operated in the apparatus 1200, contact data, phone book data, messages, pictures, videos, and the like. The memory 1204 may be implemented by any type of volatile or non-volatile memory device or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or a compact disc.

The power supply component 1206 provides power for various components of the apparatus 1200. The power supply component 1206 may include a power supply management system, one or more power supplies, and other components associated with power generation, management, and distribution for the apparatus 1200.

The multimedia component 1208 includes a screen for providing an output interface between the apparatus 1200 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, slides, and gestures on the touch panel. The touch sensor may not only sense boundaries of a touching or sliding movement, but also detect duration and pressure associated with the touching or sliding operation. In some embodiments, the multimedia component 1208 includes a front camera and/or a rear camera. When the apparatus 1200 is in an operating mode, e.g., in a camera mode or a video mode, the front camera and/or the rear camera may receive external multimedia data. Each of the front camera and the rear camera may be a fixed optical lens system or have focusing and optical zooming functions.

The audio component 1210 is configured to output and/or input audio signals. For example, the audio component 1210 includes a microphone (MIC). When the apparatus 1200 is in the operating mode, e.g., in a call mode, a record mode, and an audio recognition mode, the MIC is configured to receive external audio signals. The received audio signals may be further stored in the memory 1204 or sent through the communication component 1216. In some embodiments, the audio component 1210 further includes a loudspeaker configured to output audio signals.

The I/O interface 1212 provides an interface between the processing component 1202 and a peripheral interface module. The peripheral interface module may be a keyboard, a click wheel, buttons, or the like. The buttons may include, but are not limited to, a homepage button, a volume button, a start button, and a lock button.

The sensor component 1214 includes one or more sensors configured to provide state estimation in various aspects for the apparatus 1200. For example, the sensor component 1214 may detect an on/off state of the apparatus 1200, and relative positioning of components such as a display and a keypad of the apparatus 1200. The sensor component 1214 may further detect a position change of the apparatus 1200 or a component of the apparatus 1200, existence or absence of contact of the user on the apparatus 1200, the orientation and acceleration/deceleration of the apparatus 1200, or the temperature change of the apparatus 1200. The sensor component 1214 may include a proximity sensor configured to detect existence of a nearby object without any physical contact. The sensor component 1214 may further include an optical sensor, such as a CMOS or CCD image sensor, configured to be used in an imaging application. In some embodiments, the sensor component 1214 may further include an acceleration sensor, a gyroscope sensor, a magnetic sensor, a pressure sensor or a temperature sensor.

The communication component 1216 is configured to facilitate wired or wireless communication between the apparatus 1200 and other devices. The apparatus 1200 may be connected to a wireless network based on a communication standard, such as WiFi, 2G, 3G, or a combination thereof. In an example embodiment, the communication component 1216 receives broadcast signals or broadcast-related information from an external broadcast management system through a broadcast channel. In an example embodiment, the communication component 1216 further includes a near-field communication (NFC) module to promote short-range communication. For example, the NFC module may be implemented based on the radio frequency identification (RFID) technology, the infrared data association (IrDA) technology, the ultra-wide band (UWB) technology, the Bluetooth (BT) technology, and other technologies.

In an example embodiment, the apparatus 1200 may be implemented by one or more application specific Integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements, for performing the foregoing method.

In an example embodiment, a non-volatile computer readable storage medium is further provided, for example, the memory 1204 including computer-readable instructions executable by a processor 1218 of the apparatus 1200 to implement the foregoing method.

Figure 13:
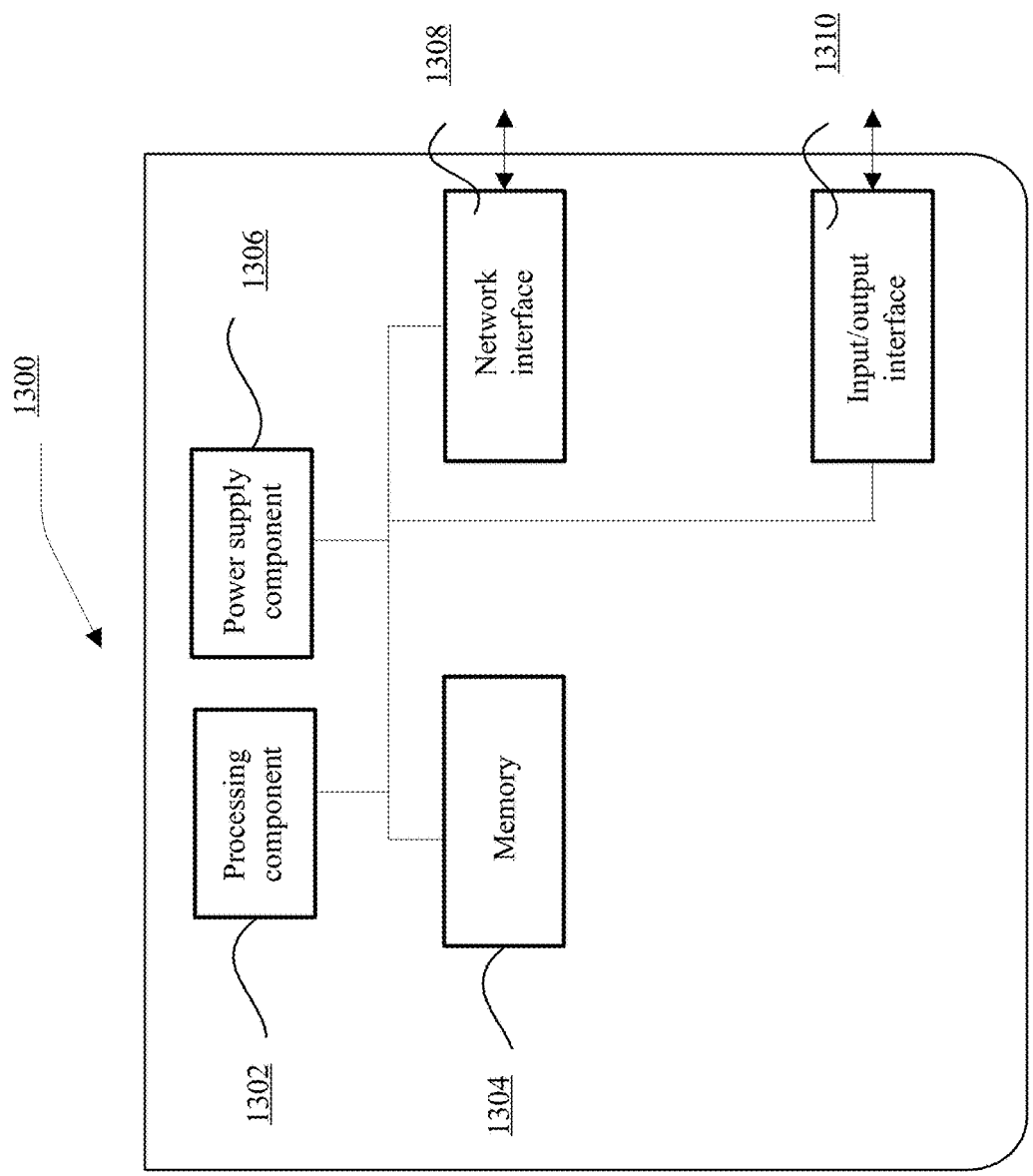
FIG. 13 is a block diagram of an apparatus for displaying a subtitle according to an example embodiment.

FIG. 13 is a block diagram of an apparatus for displaying a subtitle according to an example embodiment. For example, an apparatus 1300 may be provided as a server. Referring to FIG. 13, the apparatus 1300 includes a processing component 1302, and further includes one or more processors, and memory resources represented by a memory 1304 configured to store instructions, e.g., applications, executable by the processing component 1302. The applications stored in the memory 1304 may include one or more modules each corresponding to a set of instructions. Moreover, the processing component 1302 is configured to execute the instructions to perform the foregoing method.

The apparatus 1300 may further include a power supply component 1306 configured to manage power supply for the apparatus 1300, a wired or wireless network interface 1308 configured to connect the apparatus 1300 to a network, and an input/output (I/O) interface 1310. The apparatus 1300 may be operated based on an operating system stored in the memory 1304, such as Windows Server™, Mac OS X™, Unix™, Linux™, FreeBSD™, or the like.

In an example embodiment, a non-volatile computer readable storage medium is further provided, for example, the memory 1304 including computer-readable instructions executable by the processing component 1302 of the apparatus 1300 to implement the foregoing method.

The present disclosure may be a system, a method and/or a computer program product. The computer program product may include a computer readable storage medium, on which computer readable program instructions enabling the processor to implement various aspects of the present disclosure.

The computer readable storage medium may be a physical device capable of retaining and storing instructions used by an instruction executing device. The computer readable storage medium may be, for example, but is not limited to, an electrical storage device, a magnetic storage device, an optical storage device, an electromagnetic storage device, a semiconductor storage device, or any appropriate combination of the above. More specific examples (a non-exhaustive list) of the computer readable storage medium include: a portable computer disk, a hard disk, a random access memory (RAM), a read-only memory (ROM), an erasable programmable read-only memory (EPROM or a flash memory), a static random access memory (SRAM), a portable compact disk read-only memory (CD-ROM), a digital versatile disk (DVD), a memory stick, a floppy disk, a mechanical coding device such as a punched card or protrusions in a groove on which instructions are stored, and any appropriate combination of the above. The computer readable storage medium used here is not explained as an instantaneous signal itself, such as radio waves or other electromagnetic waves propagated freely, electromagnetic waves propagated through waveguides or other transmission media (e.g., light pulses propagated through fiber-optic cables), or electrical signals transmitted over wires.

The computer readable program instructions described here may be downloaded from the computer readable storage medium to various computing/processing devices or downloaded to external computers or external storage devices over a network such as the Internet, a local area network, a wide area network and/or a wireless network. The network may include copper transmission cables, fiber optic transmission, wireless transmission, routers, firewalls, switches, gateway computers and/or edge servers. A network adapter card or network interface in each computing/processing device receives computer readable program instructions from the network and forwards the computer readable program instructions for storage in the computer readable storage medium in each computing/processing device.

The computer-readable instructions for performing operations of the present disclosure may be assembly instructions, instruction set architecture (ISA) instructions, machine instructions, machine related instructions, microcodes, firmware instructions, state setting data, or source codes or object codes written in any combination of one or more programming languages including object-oriented programming languages, such as Smalltalk, C++, as well as conventional procedural programming languages such as "C" language or similar programming languages. The computer readable program instructions may be executed completely on a user's computer, partially on the user's computer, as a separate software package, partially on the user's computer and partially on a remote computer, or completely on the remote computer or server. In the case of the remote computer, the remote computer may be connected to the user's computer over any kind of network including a local area network (LAN) or wide area network (WAN), or it may be connected to an external computer (for example, connected over the Internet by an Internet service provider). In some embodiments, state information of the computer readable program instructions is used to customize an electronic circuit, such as a programmable logic circuit, a field programmable gate array (FPGA) or a programmable logic array (PLA). The electronic circuit may execute the computer readable program instructions to implement all aspects of the present disclosure.

Various aspects of the present disclosure are described here with reference to flowcharts and/or block diagrams of the method, apparatus (system) and computer program product according to the embodiments of the present disclosure. It should be understood that each block in the flowcharts and/or block diagrams and a combination of blocks in the flowcharts and/or block diagrams may be implemented by computer readable program instructions.

The computer readable program instructions may be provided to a general-purpose computer, a special-purpose computer, or a processor of another programmable data processing apparatus to produce a machine, such that the computer or the processor of another programmable data processing apparatus executes the instructions to produce an apparatus configured to implement functions/actions designated in one or more blocks in the flowcharts and/or block diagrams. The computer readable program instructions may also be stored in a computer readable memory and may cause the computer, the programmable data processing apparatus and/or other devices to work in a specific manner, such that the computer readable medium storing the instructions includes an article of manufacture including instructions for implementing various aspects of functions/actions specified by one or more blocks in the flowcharts and/or block diagrams.

The computer readable program instructions may also be loaded to the computer or another programmable data processing apparatus or other devices, such that a series of operation steps are executed on the computer or another programmable data processing apparatus or other devices to generate a computer implemented process, and therefore, the instructions executed in the computer or another programmable data processing apparatus or other devices implement functions/actions specified by one or more blocks in the flowcharts and/or block diagrams.

The flowcharts and block diagrams in the accompanying drawings show possibly implemented system architecture, functions and operations of the system, method and computer program product according to various embodiments of the present disclosure. In this point, each block in the flowcharts or block diagrams may represent a module, a program segment, or a part of an instruction. The module, the program segment or the part of the instruction includes one or more executable instructions for implementing specified logical functions. In some alternative implementations, functions labeled in the blocks may occur in an order different from that as labeled in the accompanying drawing. For example, two successive blocks may be actually performed basically in parallel, or performed in an opposite order sometimes, depending on involved functions. It also should be noted that each block in the block diagrams and/or flowcharts, and a combination of blocks in the block diagrams and/or flowcharts may be implemented using a dedicated hardware-based system for executing specified functions or actions, or may be implemented using a combination of dedicated hardware and computer instructions.

Various embodiments of the present disclosure have been described above, the foregoing illustration is exemplary rather than exhaustive, and the present disclosure is not limited to the disclosed embodiments. Many modifications and variations are obvious for those of ordinary skill in the art without departing from the scope and spirit of the illustrated embodiments. The terms selected in this text are aimed to best explain principles of the embodiments, actual applications, or technical improvements to technologies in the market, or enable other persons of ordinary skill in the art to understand the embodiments disclosed in this text.

The present disclosure may further be understood with clauses as follows.

Clause 1. A subtitle displaying method, comprising:
determining subtitle information of a video frame in a video when a play request for the video is received;
identifying a key region in the video frame;
determining a subtitle display region in a region in the video frame other than the key region; and
displaying subtitle content in the subtitle information in the subtitle display region during playing the video.

Clause 2. The method of clause 1, wherein the identifying a key region in the video frame comprises:
identifying the key region in the video frame by using a deep learning algorithm.

Clause 3. The method of clause 2, wherein the identifying the key region in the video frame by using a deep learning algorithm comprises:
determining a target object in the video frame by using the deep learning algorithm; and
determining a display region where the target object is located as the key region.

Clause 4. The method of clause 3, wherein the determining a display region where the target object is located as the key region in the video frame comprises:
determining a key part of the target object by using the deep learning algorithm; and
determining a display region where the key part is located as the key region.

Clause 5. The method of clause 3, wherein the target object comprises a face, and the determining a target object in the video frame by using the deep learning algorithm comprises:
detecting the video frame by using a face recognition algorithm to obtain the face.

Clause 6. The method of clause 1, wherein the identifying a key region in the video frame comprises:
traversing the video frame with a key window, and determining a region where the key window is located as a candidate region, wherein the area of the key window is less than that of the video frame;
extracting features in the candidate region, and determining whether the candidate region comprises the target object according to the extracted features; and
determining the candidate region as the key region when the candidate region comprises the target object.

Clause 7. The method of clause 1, wherein the identifying a key region in the video frame comprises:
identifying the key region in the video frame when the video frame is a close-shot picture of a video frame previous or preceding to the video frame.

Clause 8. The method of clause 1, wherein the determining a subtitle display region in a region in the video frame other than the key region comprises:
determining the subtitle display region in the region in the video frame other than the key region according to the subtitle information.

Clause 9. The method of clause 8, wherein the subtitle information comprises an original subtitle display region in the video frame, and
the determining the subtitle display region in the region in the video frame other than the key region according to the subtitle information comprises:
adjusting the original subtitle display region to the region in the video frame other than the key region when the original subtitle display region overlaps the key region.

Clause 10. The method of clause 9, wherein the adjusting the original subtitle display region to the region in the video frame other than the key region when the original subtitle display region overlaps the key region comprises:
dividing the original subtitle display region into at least two display sub-regions and adjusting the at least two display sub-regions to the region in the video frame other than the key region when the original subtitle display region overlaps the key region.

Clause 11. The method of clause 8, wherein the determining the subtitle display region in the region in the video frame other than the key region according to the subtitle information comprises:
determining the subtitle display region in the region in the video frame other than the key region according to the subtitle content in the subtitle information.

Clause 12. A subtitle displaying apparatus, comprising:
a subtitle information determining module configured to determine subtitle information of a video frame in a video when a play request for the video is received;
a key region determining module configured to identify a key region in the video frame;
a display region determining module configured to determine a subtitle display region in a region in the video frame other than the key region; and
a play module configured to display subtitle content in the subtitle information in the subtitle display region during playing the video.

Clause 13. The apparatus of clause 12, wherein the key region determining module comprises:
a first key region determining sub-module configured to identify the key region in the video frame by using a deep learning algorithm.

Clause 14. The apparatus of clause 13, wherein the first key region determining sub-module comprises:
a target object determining sub-module configured to determine a target object in the video frame by using the deep learning algorithm; and
a second key region determining sub-module configured to determine a display region where the target object is located as the key region.

Clause 15. The apparatus of clause 14, wherein the second key region determining sub-module comprises:
a key part determining sub-module configured to determine a key part of the target object by using the deep learning algorithm; and
a third key region determining sub-module configured to determine a display region where the key part is located as the key region.

Clause 16. The apparatus of clause 14, wherein the target object comprises a face, and the target object determining sub-module comprises:

a face detecting sub-module configured to detect the video frame by using a face recognition algorithm to obtain the face.

Clause 17. The apparatus of clause 12, wherein the key region determining module comprises:
a traversing sub-module configured to traverse the video frame with a key window, and determine a region where the key window is located as a candidate region, wherein the area of the key window is less than that of the video frame;
a feature extracting sub-module configured to extract features in the candidate region, and determine whether the candidate region comprises the target object according to the extracted features; and
a fourth key region determining sub-module configured to determine the candidate region as the key region when the candidate region comprises the target object.

Clause 18. The apparatus of clause 12, wherein the key region determining module comprises:
a fifth key region determining sub-module configured to determine the key region in the video frame by using the deep learning algorithm when the video frame is a close-shot picture of a video frame previous or preceding to the video frame.

Clause 19. The apparatus of clause 12, wherein the display region determining module comprises:
a first display region determining sub-module configured to determine the subtitle display region in the region in the video frame other than the key region according to the subtitle information.

Clause 20. The apparatus of clause 19, wherein the subtitle information comprises an original subtitle display region in the video frame, and the first display region determining sub-module comprises:
a second display region determining sub-module configured to adjust the original subtitle display region to the region in the video frame other than the key region when the original subtitle display region overlaps the key region.

Clause 21. The apparatus of clause 20, wherein the second display region determining sub-module comprises:
a third display region determining sub-module configured to divide the original subtitle display region into at least two display sub-regions and adjust the at least two display sub-regions to the region in the video frame other than the key region when the original subtitle display region overlaps the key region.

Clause 22. The apparatus of clause 19, wherein the first display region determining sub-module comprises:
a fourth display region determining sub-module configured to determine the subtitle display region in the region in the video frame other than the key region according to the subtitle content in the subtitle information.

Clause 23. A subtitle displaying apparatus, comprising:
a processor; and
a memory configured to store instructions executable by the processor,
wherein the processor is configured to perform the method of any of clauses 1 to 11.

Clause 24. A non-volatile computer readable storage medium, having computer-readable instructions stored thereon, wherein when the computer-readable instructions are executed by a processor, the method of any of clauses 1 to 11 is implemented.

What is claimed is:

1. A method comprising:
determining subtitle information of a video frame in a video, the subtitle information including a subtitle content;
identifying a key region in the video frame, wherein identifying the key region in the video frame comprises:
traversing the video frame with a window, an area of the window being less than that of the video frame;
determining a region where the window is located as a candidate region;
extracting features in the candidate region;
determining whether the candidate region comprises a target object according to the extracted features; and
determining the candidate region as the key region in response to determining that the candidate region comprises the target object;
determining a subtitle display region in a region in the video frame other than the key region; and
displaying the subtitle content in the subtitle display region.

2. The method of claim 1, wherein the identifying the key region in the video frame further comprises:
identifying the key region in the video frame by using a deep learning algorithm.

3. The method of claim 1, wherein the identifying the key region in the video frame further comprises determining the target object in the video frame by using a deep learning algorithm.

4. The method of claim 1, wherein the identifying the key region in the video frame further comprises:
determining a key part of the target object by using a deep learning algorithm; and
determining a display region where the key part is located as the key region.

5. The method of claim 4, wherein the target object comprises a face.

6. The method of claim 5, wherein the determining the key part of the target object in the video frame by using the deep learning algorithm comprises:
detecting the video frame by using a face recognition algorithm to obtain the face.

7. The method of claim 1, wherein the identifying the key region in the video frame further comprises:
determining that the video frame is a close-shot picture of a video frame previous or preceding to the video frame; and
identifying the key region in the video frame.

8. The method of claim 1, wherein the determining the subtitle display region in the region in the video frame other than the key region comprises:
determining the subtitle display region in the region in the video frame other than the key region according to the subtitle information.

9. The method of claim 8, wherein the subtitle information comprises an original subtitle display region in the video frame.

10. The method of claim 9, wherein the determining the subtitle display region in the region in the video frame other than the key region according to the subtitle information comprises:
determining that the original subtitle display region overlaps the key region; and
adjusting the original subtitle display region to the region in the video frame other than the key region.

11. The method of claim 10, wherein the adjusting the original subtitle display region to the region in the video frame other than the key region comprises:
dividing the original subtitle display region into at least two display sub-regions; and adjusting the at least two display sub-regions to the region in the video frame other than the key region.

12. The method of claim 8, wherein the determining the subtitle display region in the region in the video frame other than the key region according to the subtitle information comprises:
  determining the subtitle display region in the region in the video frame other than the key region according to the subtitle content in the subtitle information.

13. An apparatus comprising:
  one or more processors; and
  one or more memories stored thereon computer readable instructions that, when executed by the one or more processors, cause the one or more processors to perform acts comprising:
  determining subtitle information of a video frame in a video, the subtitle information including a subtitle content;
  identifying a key region in the video frame, wherein identifying the key region in the video frame comprises:
    traversing the video frame with a window, an area of the window being less than that of the video frame;
    determining a region where the window is located as a candidate region;
    extracting features in the candidate region;
    determining whether the candidate region comprises a target object according to the extracted features; and
    determining the candidate region as the key region in response to determining that the candidate region comprises the target object
  determining a subtitle display region in a region in the video frame other than the key region; and
  displaying the subtitle content in the subtitle display region.

14. The apparatus of claim 13, wherein the determining the subtitle display region in the region in the video frame other than the key region comprises:
  determining the subtitle display region in the region in the video frame other than the key region according to the subtitle information.

15. The apparatus of claim 14, wherein:
  the subtitle information comprises an original subtitle display region in the video frame; and
  the determining the subtitle display region in the region in the video frame other than the key region according to the subtitle information comprises:
  determining that the original subtitle display region overlaps the key region; and
  adjusting the original subtitle display region to the region in the video frame other than the key region.

16. The apparatus of claim 15, wherein the adjusting the original subtitle display region to the region in the video frame other than the key region comprises:
  dividing the original subtitle display region into at least two display sub-regions; and
  adjusting the at least two display sub-regions to the region in the video frame other than the key region.

17. One or more memories stored thereon computer readable instructions that, when executed by one or more processors, cause the one or more processors to perform acts comprising:
  determining subtitle information of a video frame in a video, the subtitle information including a subtitle content and an original subtitle display region in the video frame;
  identifying a key region in the video frame, wherein identifying the key region in the video frame comprises:
    traversing the video frame with a window, an area of the window being less than that of the video frame;
    determining a region where the window is located as a candidate region;
    extracting features in the candidate region;
    determining whether the candidate region comprises a target object according to the extracted features; and
    determining the candidate region as the key region in response to determining that the candidate region comprises the target object;
  determining that the original subtitle display region overlaps the key region; and
  adjusting the original subtitle display region to the region in the video frame other than the key region; and
  displaying the subtitle content in the subtitle display region.

18. The one or more memories of claim 17, wherein the determining the subtitle display region in the region in the video frame other than the key region comprises:
  determining the subtitle display region in the region in the video frame other than the key region according to the subtitle information.

19. The one or more memories of claim 17, wherein the subtitle information comprises an original subtitle display region in the video frame.

20. The one or more memories of claim 17, wherein the adjusting the original subtitle display region to the region in the video frame other than the key region comprises:
  dividing the original subtitle display region into at least two display sub-regions; and
  adjusting the at least two display sub-regions to the region in the video frame other than the key region.

* * * * *